(12) United States Patent
Spunar et al.

(10) Patent No.: US 11,186,143 B2
(45) Date of Patent: Nov. 30, 2021

(54) VEHICLE HVAC SYSTEM

(71) Applicants: DENSO International America, Inc., Southfield, MI (US); DENSO CORPORATION, Kariya (JP)

(72) Inventors: Nicholaus Spunar, Southfield, MI (US); Brian Belanger, Rochester Hills, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/906,636

(22) Filed: Jun. 19, 2020

(65) Prior Publication Data

US 2020/0406713 A1    Dec. 31, 2020

Related U.S. Application Data

(60) Provisional application No. 62/866,241, filed on Jun. 25, 2019.

(51) Int. Cl.
*B60H 1/24* (2006.01)
(52) U.S. Cl.
CPC .................... *B60H 1/242* (2013.01)
(58) Field of Classification Search
CPC .......... B60H 1/242; B60H 2001/00214; B60H 1/00471; B60H 1/00535; B60H 1/00542; B60H 1/00207
See application file for complete search history.

(56) References Cited

U.S. PATENT DOCUMENTS

| 4,467,706 A | * | 8/1984 | Batcheller ............ B01D 50/002 165/244 |
| 4,709,855 A | * | 12/1987 | Brenner .................... B60H 1/18 237/12.3 A |
| 4,711,159 A | * | 12/1987 | Armbruster .......... B60H 3/0616 454/137 |
| 7,726,142 B2 |  | 6/2010 | Keen |

(Continued)

FOREIGN PATENT DOCUMENTS

| DE | 3738425 A1 | 5/1989 |
| DE | 102009057870 A1 | 6/2011 |
| EP | 0799733 A2 | 10/1997 |

(Continued)

OTHER PUBLICATIONS

International Search Report regarding International Application No. PCT/US2020/039603, dated Oct. 7, 2020.

(Continued)

*Primary Examiner* — Jessica Yuen
(74) *Attorney, Agent, or Firm* — Harness, Dickey & Pierce, P.L.C.

(57) ABSTRACT

A heating, ventilation, and air conditioning (HVAC) system for a vehicle. The HVAC system includes an airflow inlet case defining a fresh air inlet and a recirculation air inlet. The airflow inlet case includes an evaporator and a filter both aligned with an axis of rotation of a blower configured to draw airflow through the airflow inlet case into a heater case. The recirculation air inlet faces the heater case. The airflow inlet case is configured to be mounted on an engine side of a vehicle firewall such that the recirculation air inlet is at the firewall.

17 Claims, 4 Drawing Sheets

(56) References Cited

U.S. PATENT DOCUMENTS 9,649,908 B2 5/2017 Takeuchi et al.
2017/0043646 A1 2/2017 Lee et al.

FOREIGN PATENT DOCUMENTS

| EP | 1409280 A2 | 4/2004 |
|----|------------|--------|
| EP | 2119582 A1 | 11/2009 |
| JP | 2010-100140 A | 5/2010 |
| WO | WO-2019/021706 A1 | 1/2019 |

OTHER PUBLICATIONS

Written Opinion of the International Searching Authority regarding International Application No. PCT/US2020/039603, dated Oct. 7, 2020.

\* cited by examiner

VEHICLE HVAC SYSTEM

CROSS-REFERENCE TO RELATED APPLICATION

This application claims the benefit of U.S. Provisional Application No. 62/866,241 filed on Jun. 25, 2019, the entire disclosure of which is incorporated herein by reference.

FIELD

The present disclosure relates to a heating, ventilation, and air conditioning system for a vehicle.

BACKGROUND

This section provides background information related to the present disclosure, which is not necessarily prior art.

Vehicle heating, ventilation, and air conditioning (HVAC) systems are typically mounted on a passenger cabin side of the vehicle firewall. While existing vehicle HVAC systems are suitable for their intended use, they are subject to improvement. The present disclosure provides for an improved vehicle HVAC system having the advantages set forth herein. One skilled in the art will appreciate that the present disclosure provides for numerous additional advantages and unexpected results as well.

SUMMARY

This section provides a general summary of the disclosure, and is not a comprehensive disclosure of its full scope or all of its features.

The present disclosure includes a heating, ventilation, and air conditioning (HVAC) system for a vehicle. The HVAC system has an airflow inlet case defining a fresh air inlet and a recirculation air inlet. The airflow inlet case includes an evaporator and a filter both aligned with an axis of rotation of a blower configured to draw airflow through the airflow inlet case into a heater case. The recirculation air inlet faces the heater case. The airflow inlet case is configured to be mounted on an engine side of a vehicle firewall such that the recirculation air inlet is at the firewall.

The present disclosure further includes a heating, ventilation, and air conditioning (HVAC) system for a vehicle. The HVAC system has a blower case including a blower configured to rotate about an axis of rotation. A heater case is on a first side of the blower case. The heater case includes a heater aligned with the axis of rotation of the blower. An airflow inlet case is on a second side of the blower case. The airflow inlet case includes an evaporator aligned with the axis of rotation of the blower. The airflow inlet case defines a fresh air inlet, and a recirculation air inlet facing the heater case. The airflow inlet case is configured to be mounted on an engine side of a vehicle firewall. The heater case is configured to be mounted on a passenger cabin side of the vehicle firewall.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
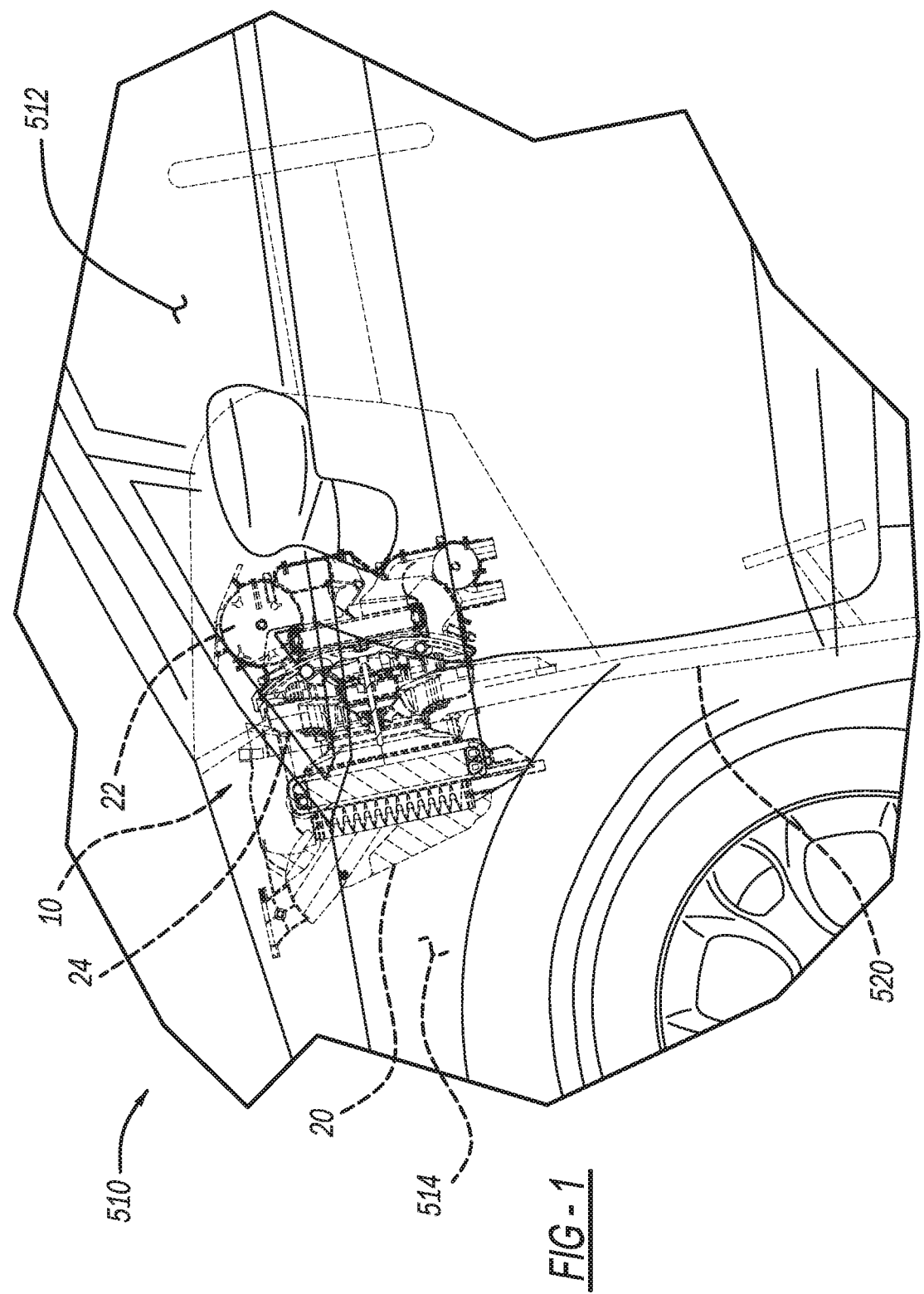
FIG. 1 illustrates an exemplary HVAC system in accordance with the present disclosure installed in an exemplary vehicle.

FIG. 1 illustrates a heating, ventilation, and air conditioning (HVAC) system 10 in accordance with the present disclosure installed in an exemplary vehicle 510. Although the vehicle 510 is illustrated as a passenger vehicle, the vehicle 510 may be any other suitable vehicle, such as any suitable mass transit vehicle, commercial vehicle, utility vehicle, recreational vehicle, construction vehicle/equipment, military vehicle/equipment, watercraft, aircraft, etc. The HVAC system 10 may also be installed in any suitable non-vehicular application, such as any application including a firewall.

The vehicle 510 includes a passenger cabin 512 and an engine compartment 514. The engine compartment 514 may include any suitable system for propelling the vehicle 510, such as an internal combustion engine, electric motor, hybrid system, etc. A firewall 520 separates the passenger cabin 512 from the engine compartment 514.

The HVAC system 10 generally includes an airflow inlet case 20, a heater case 22, and a blower case 24. When installed in the vehicle 510, the HVAC system 10 is configured such that the airflow inlet case 20 is on a side of the firewall 520 facing the engine compartment 514, and the heater case 22 is on a side of the firewall 520 facing the passenger cabin 512. The airflow inlet case 20 may be arranged in the engine compartment 514, and the heater case 22 may be arranged in the passenger cabin 512, for example. The blower case 24 is between the airflow inlet case 20 and the heater case 22. When installed in the vehicle 510, the blower case 24 extends through the firewall 520 to connect the airflow inlet case 20 to the heater case 22.

Figure 2A:
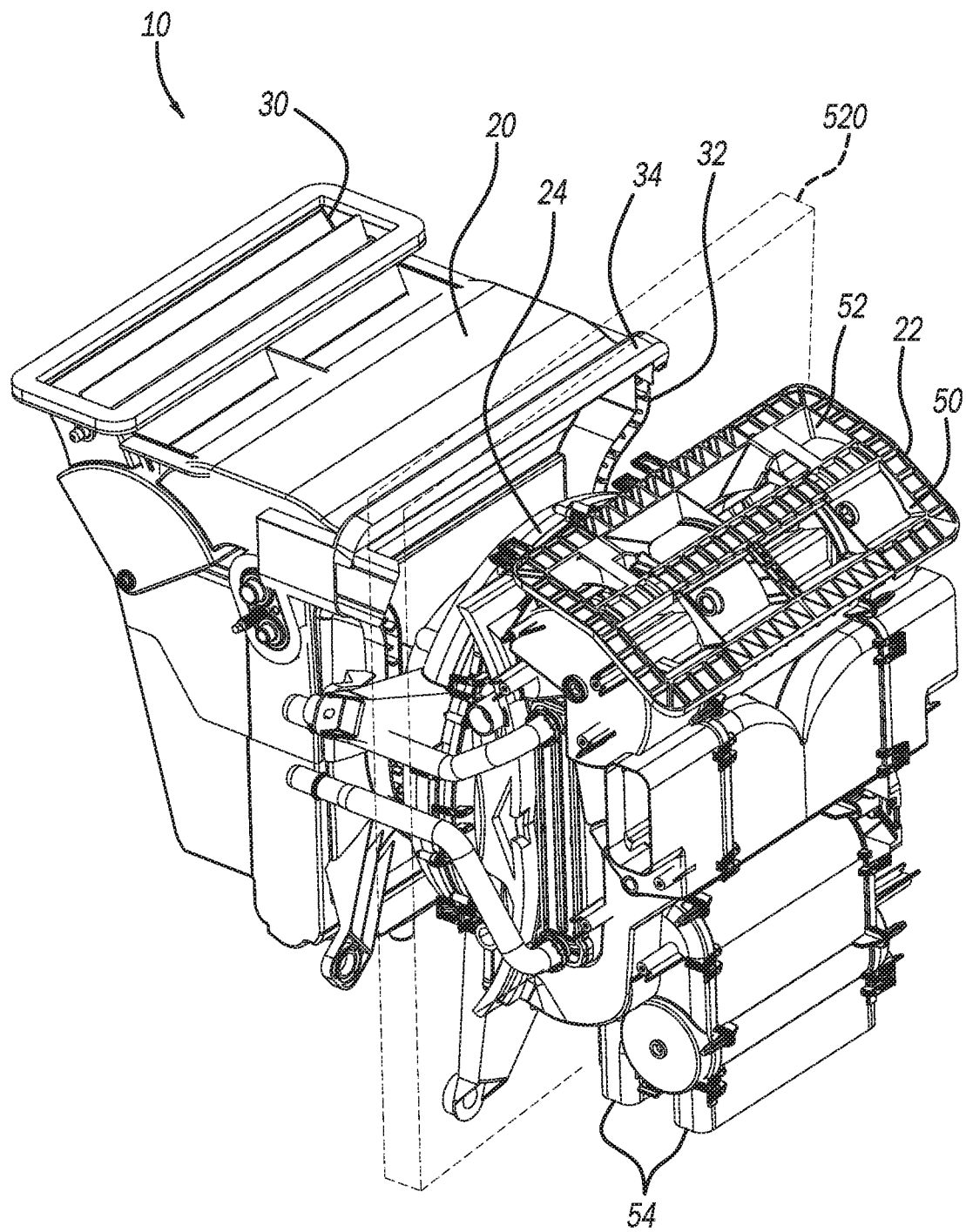
FIG. 2A is a first perspective view of the HVAC system of FIG. 1.
Figure 2B:
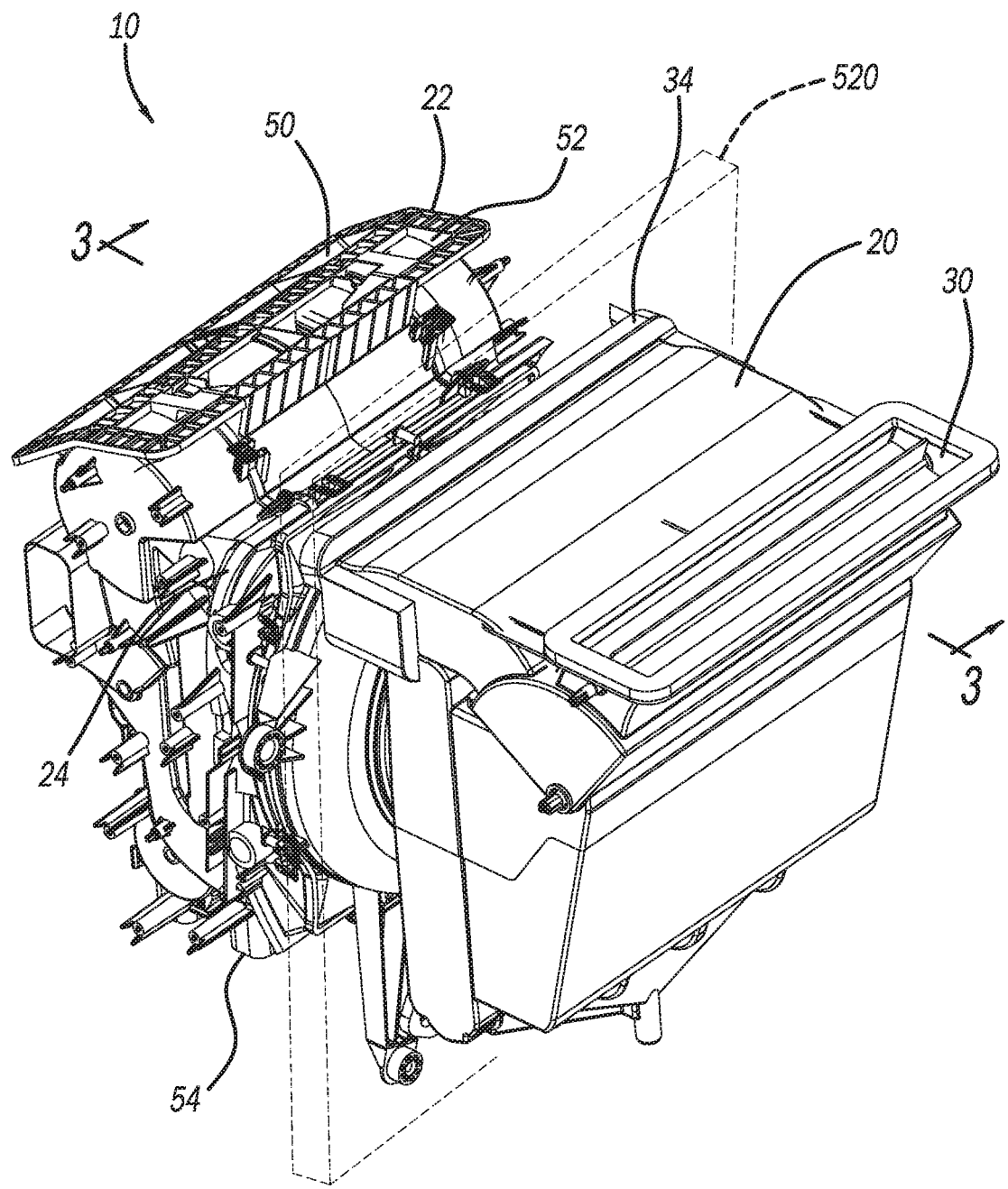
FIG. 2B is a second perspective view of the HVAC system of FIG. 1.
Figure 3:
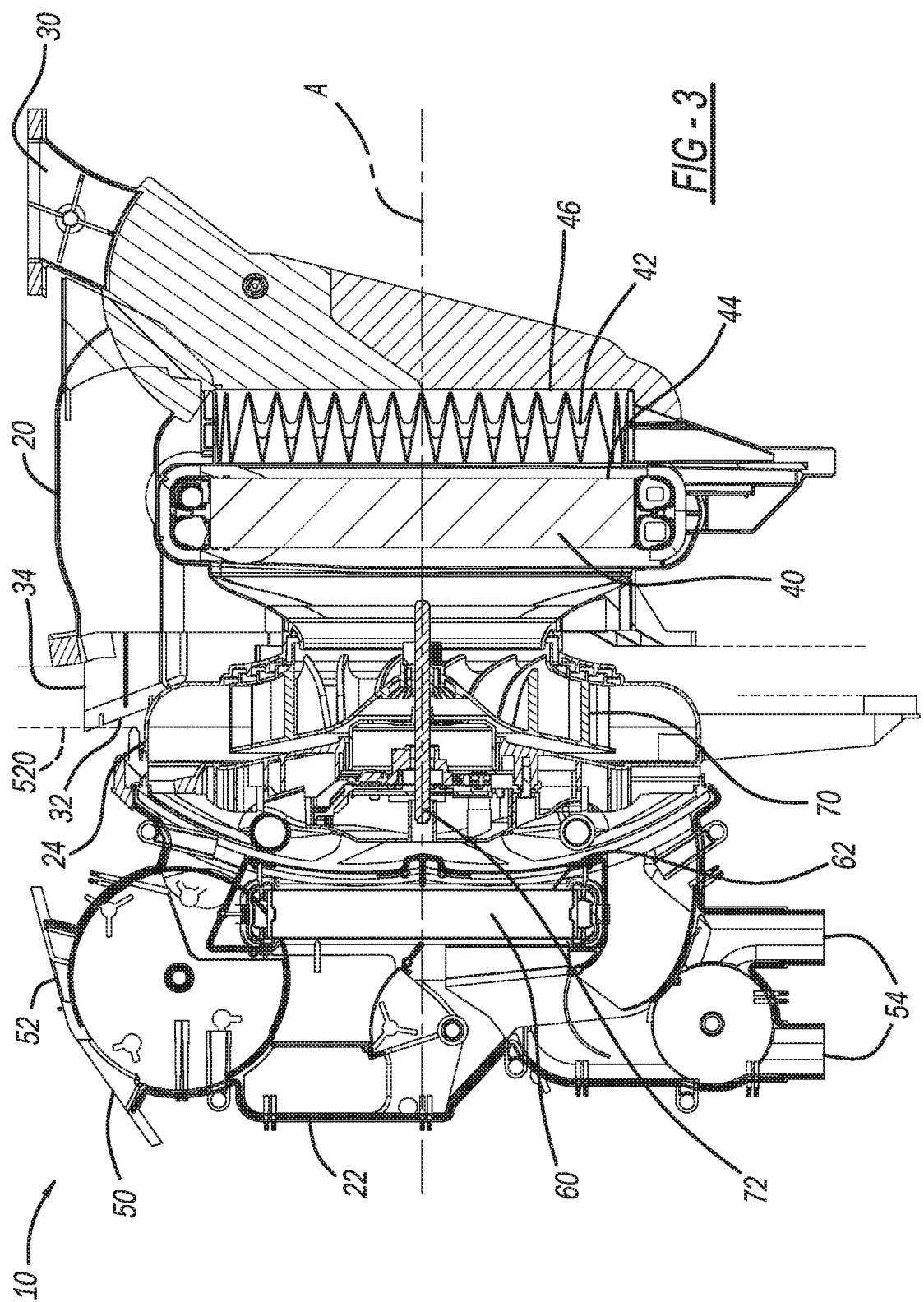
FIG. 3 is a cross-sectional view of the HVAC system of FIG. 1 taken along line 3-3 of FIG. 2B.

With additional reference to FIGS. 2A, 2B, and 3, the airflow inlet case 20 defines a fresh air inlet 30 and a recirculation air inlet 32. The recirculation air inlet 32 faces the blower case 24 and the heater case 22. The recirculation air inlet 32 is defined at the end of a recirculation air duct 34. The recirculation air duct 34 extends to the firewall 520 and is unitary with, and monolithic with, at least a portion of the airflow inlet case 20. The recirculation air duct 34 extends towards the heater case 22 and overlaps the blower case 24. The recirculation air inlet 32 is at the firewall 520 when the HVAC system 10 is installed in the vehicle 510. Recirculated cabin air flows into the HVAC system 10 through the recirculation air inlet 32. Fresh air flows into the HVAC system 10 through the fresh air inlet 30, which extends to an exterior of the vehicle 510 or is ducted to the exterior of the vehicle 510.

With reference to FIG. 3, the airflow inlet case 20 includes an evaporator 40 and a filter 42. The filter 42 is arranged on an upstream side of the evaporator 40 to filter containments from airflow that has entered the airflow inlet case 20 through the fresh air inlet 30 or the recirculation air inlet 32.

The filter 42 is on a side of the evaporator 40 opposite to the heater case 22. The evaporator 40 is configured to cool airflow passing across the evaporator 40. The evaporator 40 includes an upstream face 44, and the filter 42 includes an upstream face 46, each of which extend parallel to one another.

With particular reference to FIG. 3, the heater case 22 defines a plurality of airflow outlets, including face outlets 50, defrost outlets 52, and foot outlets 54. Mounted within the heater case 22 is a heater 60, which heats airflow passing over the heater 60. The heater 60 may be any suitable heater, such as a heater core, condenser, electrical resistance heater, etc. The heater 60 has an upstream face 62, which faces the blower case 24 and the airflow inlet case 20. The upstream face 62 of the heater 60 may extend parallel to the upstream face 44 of the evaporator 40 and the upstream face 46 of the filter 42.

The blower case 24 includes a blower 70. The blower 70 rotates about an axis of rotation 72. A longitudinal axis A extending along the axis of rotation 72 extends through the evaporator 40 and the filter 42, as well as through the heater 60. In some applications, such as illustrated in FIG. 3, the longitudinal axis A extends through centers of each one of the evaporator 40, the filter 42, and the heater 60. The longitudinal axis A may also extend perpendicular to each one of the upstream faces 44, 46 and 62, as illustrated in FIG. 3. The evaporator 40, the filter 42, and the heater 60 need not be aligned along the axis A, however, and the upstream faces 44, 46, and 62 need not extend perpendicular to the axis A.

The HVAC system 10 advantageously maximizes useable space within the passenger cabin 512. For example, the airflow inlet case 20 is configured to be mounted in the engine compartment 514 as opposed to the passenger cabin 512, which frees up space in the passenger cabin 512. Arranging the airflow inlet case 20 and the evaporator 40 on the side of the firewall 520 facing the engine compartment 514 also advantageously makes water management of the evaporator 40 easier because there is little to no possibility of liquid from the evaporator 40 leaking into the passenger cabin 512. Also, any noise generated by the evaporator 40 is unlikely to be heard in the passenger cabin 512, thus making overall operation of the HVAC system 10 quieter.

The HVAC system 10 is also advantageously more compact as compared to existing HVAC systems, thus freeing up valuable space in both the passenger cabin 512 and the engine compartment 514. The HVAC system 10 is made more compact by, for example, arranging each one of the evaporator 40, the filter 42, and the heater 60 along the longitudinal axis A extending through the axis of rotation 72 of the blower 70. Also, arranging the upstream faces 44, 46 and 62 of the evaporator 40, the filter 42, and the heater 60 respectively, such that the upstream faces 44, 46 and 62 extend parallel to each other, allows the evaporator 40, the filter 42, and the heater 60 to be arranged closer to the blower case 24, thereby making the HVAC system 10 more compact. The HVAC system 10 may still be made sufficiently compact when the evaporator 40, the filter 42, and the heater 60 are not aligned directly along the longitudinal axis A, and when the upstream faces 44, 46, and 62 are not parallel to each other.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air conditioning (HVAC) system for a vehicle, the HVAC system comprising:
an airflow inlet case defining a fresh air inlet and a recirculation air inlet, the airflow inlet case including an evaporator and a filter both aligned with an axis of rotation of a blower configured to draw airflow through the airflow inlet case into a heater case including a heater, the recirculation air inlet faces in a direction of the heater case;
wherein the airflow inlet case is configured to be mounted on an engine side of a vehicle firewall with the recirculation air inlet at the firewall, the heater case is configured to be mounted on a passenger cabin side of the firewall, and the blower is configured to be mounted at the firewall with portions of the blower on opposite sides of the firewall; and
wherein with respect to a direction of airflow through the HVAC system, the filter is upstream of the evaporator, the blower is downstream of the evaporator and between the evaporator and the heater, and the heater is downstream of the blower.

2. The HVAC system of claim 1, wherein an inlet face of the evaporator extends parallel to an inlet face of the filter.

3. The HVAC system of claim 1, further comprising a blower case including the blower, the blower case is between, and coupled to, the airflow inlet case and the heater case.

4. The HVAC system of claim 3, wherein the blower case extends across the firewall when the HVAC system is mounted in the vehicle.

5. The HVAC system of claim 1, wherein the heater is aligned with the axis of rotation of the blower.

6. The HVAC system of claim 5, wherein a longitudinal axis extending through the axis of rotation of the blower extends through a center of the evaporator, a center of the heater, and a center of the filter, the filter is on a side of the evaporator opposite to the heater case.

7. The HVAC system of claim 6, wherein the axis of rotation of the blower extends perpendicular to a face of the evaporator and a face of the filter.

8. The HVAC system of claim 1, wherein the recirculation air inlet overlaps the blower case.

9. A heating, ventilation, and air conditioning (HVAC) system for a vehicle, the HVAC system comprising:
a blower case including a blower configured to rotate about an axis of rotation;
a heater case on a first side of the blower case, the heater case including a heater aligned with the axis of rotation of the blower; and
an airflow inlet case on a second side of the blower case, the airflow inlet case including an evaporator aligned with the axis of rotation of the blower and a filter, the airflow inlet case defining a fresh air inlet and a recirculation air inlet, the recirculation air inlet faces in a direction of the heater case;
wherein the airflow inlet case is configured to be mounted on an engine side of a vehicle firewall, and the heater case is configured to be mounted on a passenger cabin side of the vehicle firewall, and the blower case is configured to be mounted at the firewall with portions of the blower case on opposite sides of the firewall; and
wherein with respect to a direction of airflow through the HVAC system, the filter is upstream of the evaporator, the blower is downstream of the evaporator and between the evaporator and the heater, and the heater is downstream of the blower.

10. The HVAC system of claim 9, wherein the blower case is coupled to the heater case and the airflow inlet case.

11. The HVAC system of claim 9, wherein a longitudinal axis extending along the axis of rotation of the blower extends through a center of the evaporator, a center of the heater, and a center of the filter that is on a side of the evaporator opposite to the heater case.

12. The HVAC system of claim 9, wherein the axis of rotation of the blower extends perpendicular to a face of the evaporator and a face of the filter that is on a side of the evaporator opposite to the heater case.

13. The HVAC system of claim 12, wherein the face of the evaporator and the face of the filter extend parallel to each other.

14. The HVAC system of claim 9, wherein the recirculation air inlet is at the firewall when the HVAC system is installed in the vehicle.

15. The HVAC system of claim 9, wherein the recirculation air inlet faces the blower.

16. The HVAC system of claim 9, wherein the recirculation air inlet is at an end of a recirculation air duct of the airflow inlet case, the recirculation air duct is monolithic with at least a portion of the airflow inlet case.

17. The HVAC system of claim 16, wherein the recirculation air inlet is at an end of a recirculation air duct of the airflow inlet case, the recirculation air duct extends over the blower case.

* * * * *